United States Patent
Knight et al.

(10) Patent No.: US 8,645,378 B2
(45) Date of Patent: Feb. 4, 2014

(54) SYSTEM AND METHOD FOR DISPLAYING RELATIONSHIPS BETWEEN CONCEPTS TO PROVIDE CLASSIFICATION SUGGESTIONS VIA NEAREST NEIGHBOR

(75) Inventors: William C. Knight, Bainbridge Island, WA (US); Nicholas I. Nussbaum, Seattle, WA (US); John W. Conwell, Tukwila, WA (US)

(73) Assignee: FTI Consulting, Inc., Annapolis, MD (US)

( * ) Notice: Subject to any disclaimer, the term of this patent is extended or adjusted under 35 U.S.C. 154(b) by 177 days.

(21) Appl. No.: 12/844,813

(22) Filed: Jul. 27, 2010

(65) Prior Publication Data

US 2011/0029532 A1 Feb. 3, 2011

Related U.S. Application Data

(60) Provisional application No. 61/229,216, filed on Jul. 28, 2009, provisional application No. 61/236,490, filed on Aug. 24, 2009.

(51) Int. Cl.
*G06F 7/00* (2006.01)
*G06F 17/30* (2006.01)

(52) U.S. Cl.
USPC ............................. 707/737; 707/738; 707/749

(58) Field of Classification Search
USPC ........................................... 707/737, 748, 73
See application file for complete search history.

(56) References Cited

U.S. PATENT DOCUMENTS

| | | | |
|---|---|---|---|
| 3,416,150 A | 12/1968 | Lindberg | |
| 3,426,210 A | 2/1969 | Agin | |
| 3,668,658 A | 6/1972 | Flores et al. | |
| 4,893,253 A | 1/1990 | Lodder | |
| 5,056,021 A | 10/1991 | Ausborn | |
| 5,121,338 A | 6/1992 | Lodder | |
| 5,133,067 A | 7/1992 | Hara et al. | |
| 5,278,980 A | 1/1994 | Pedersen et al. | |

(Continued)

FOREIGN PATENT DOCUMENTS

| EP | 1024437 | 8/2000 |
|---|---|---|
| EP | 1049030 | 11/2000 |

(Continued)

OTHER PUBLICATIONS

O'Neill et al., "DISCO: Intelligent Help for Document Review," 12th International Conference on Artificial Intelligence and Law, Barcelona, Spain, Jun. 8, 2009, pp. 1-10, ICAIL 2009, Association for Computing Machinery, Red Hook, New York (Online); XP 002607216.

(Continued)

*Primary Examiner* — Ann Chempakaseril
(74) *Attorney, Agent, or Firm* — Patrick J. S. Inouye; Krista A. Wittman; Leonid Kisselev

(57) ABSTRACT

A system and method for displaying relationships between concepts to provide classification suggestions via nearest neighbor is provided. Reference concepts previously classified and a set of uncoded concepts are provided. At least one uncoded concept is compared with the reference concepts. One or more of the reference concepts that are similar to the at least one uncoded concept are identified. Relationships between the at least one uncoded concept and the similar reference concept are depicted on a display for classifying the at least one uncoded concept.

20 Claims, 7 Drawing Sheets

(56) References Cited

U.S. PATENT DOCUMENTS

| | | | |
|---|---|---|---|
| 5,371,673 | A | 12/1994 | Fan |
| 5,442,778 | A | 8/1995 | Pedersen et al. |
| 5,477,451 | A | 12/1995 | Brown et al. |
| 5,488,725 | A | 1/1996 | Turtle et al. |
| 5,524,177 | A | 6/1996 | Suzuoka |
| 5,528,735 | A | 6/1996 | Strasnick et al. |
| 5,619,632 | A | 4/1997 | Lamping et al. |
| 5,619,709 | A | 4/1997 | Caid et al. |
| 5,635,929 | A | 6/1997 | Rabowsky et al. |
| 5,649,193 | A | 7/1997 | Sumita et al. |
| 5,675,819 | A | 10/1997 | Schuetze |
| 5,696,962 | A | 12/1997 | Kupiec |
| 5,737,734 | A | 4/1998 | Schultz |
| 5,754,938 | A | 5/1998 | Herz et al. |
| 5,794,236 | A | 8/1998 | Mehrle |
| 5,799,276 | A | 8/1998 | Komissarchik et al. |
| 5,819,258 | A | 10/1998 | Vaithyanathan et al. |
| 5,842,203 | A | 11/1998 | D'Elena et al. |
| 5,844,991 | A | 12/1998 | Hochberg et al. |
| 5,857,179 | A | 1/1999 | Vaithyanathan et al. |
| 5,860,136 | A | 1/1999 | Fenner |
| 5,862,325 | A | 1/1999 | Reed et al. |
| 5,864,846 | A | 1/1999 | Voorhees et al. |
| 5,864,871 | A | 1/1999 | Kitain et al. |
| 5,867,799 | A | 2/1999 | Lang et al. |
| 5,870,740 | A | 2/1999 | Rose et al. |
| 5,909,677 | A | 6/1999 | Broder et al. |
| 5,915,024 | A | 6/1999 | Kitaori et al. |
| 5,920,854 | A | 7/1999 | Kirsch et al. |
| 5,924,105 | A | 7/1999 | Punch et al. |
| 5,940,821 | A | 8/1999 | Wical |
| 5,950,146 | A | 9/1999 | Vapnik |
| 5,950,189 | A | 9/1999 | Cohen et al. |
| 5,966,126 | A | 10/1999 | Szabo |
| 5,987,446 | A | 11/1999 | Corey et al. |
| 6,006,221 | A | 12/1999 | Liddy et al. |
| 6,012,053 | A | 1/2000 | Pant et al. |
| 6,026,397 | A | 2/2000 | Sheppard |
| 6,038,574 | A | 3/2000 | Pitkow et al. |
| 6,070,133 | A | 5/2000 | Brewster et al. |
| 6,089,742 | A | 7/2000 | Warmerdam et al. |
| 6,092,059 | A | 7/2000 | Straforini et al. |
| 6,094,649 | A | 7/2000 | Bowen et al. |
| 6,100,901 | A | 8/2000 | Mohda et al. |
| 6,119,124 | A | 9/2000 | Broder et al. |
| 6,122,628 | A | 9/2000 | Castelli et al. |
| 6,137,499 | A | 10/2000 | Tesler |
| 6,137,545 | A | 10/2000 | Patel et al. |
| 6,137,911 | A | 10/2000 | Zhilyaev |
| 6,148,102 | A | 11/2000 | Stolin |
| 6,154,219 | A | 11/2000 | Wiley et al. |
| 6,167,368 | A | 12/2000 | Wacholder |
| 6,173,275 | B1 | 1/2001 | Caid et al. |
| 6,202,064 | B1 | 3/2001 | Julliard |
| 6,216,123 | B1 | 4/2001 | Robertson et al. |
| 6,243,713 | B1 | 6/2001 | Nelson et al. |
| 6,243,724 | B1 | 6/2001 | Mander et al. |
| 6,260,038 | B1 | 7/2001 | Martin et al. |
| 6,326,962 | B1 | 12/2001 | Szabo |
| 6,338,062 | B1 | 1/2002 | Liu |
| 6,345,243 | B1 | 2/2002 | Clark |
| 6,349,296 | B1 | 2/2002 | Broder et al. |
| 6,349,307 | B1 | 2/2002 | Chen |
| 6,360,227 | B1 | 3/2002 | Aggarwal et al. |
| 6,363,374 | B1 | 3/2002 | Corston-Oliver et al. |
| 6,377,287 | B1 | 4/2002 | Hao et al. |
| 6,381,601 | B1 | 4/2002 | Fujiwara et al. |
| 6,389,433 | B1 | 5/2002 | Bolonsky et al. |
| 6,389,436 | B1 | 5/2002 | Chakrabarti et al. |
| 6,408,294 | B1 | 6/2002 | Getchius et al. |
| 6,414,677 | B1 | 7/2002 | Robertson et al. |
| 6,415,283 | B1 | 7/2002 | Conklin |
| 6,418,431 | B1 | 7/2002 | Mahajan et al. |
| 6,421,709 | B1 | 7/2002 | McCormick et al. |
| 6,438,537 | B1 | 8/2002 | Netz et al. |
| 6,438,564 | B1 | 8/2002 | Morton et al. |
| 6,442,592 | B1 | 8/2002 | Alumbaugh et al. |
| 6,446,061 | B1 | 9/2002 | Doerre et al. |
| 6,449,612 | B1 | 9/2002 | Bradley et al. |
| 6,453,327 | B1 | 9/2002 | Nielsen |
| 6,460,034 | B1 | 10/2002 | Wical |
| 6,470,307 | B1 | 10/2002 | Turney |
| 6,480,843 | B2 | 11/2002 | Li |
| 6,480,885 | B1 | 11/2002 | Olivier |
| 6,484,168 | B1 | 11/2002 | Pennock et al. |
| 6,484,196 | B1 | 11/2002 | Maurille |
| 6,493,703 | B1 | 12/2002 | Knight et al. |
| 6,496,822 | B2 | 12/2002 | Rosenfelt et al. |
| 6,502,081 | B1 | 12/2002 | Wiltshire, Jr. et al. |
| 6,507,847 | B1 | 1/2003 | Fleischman |
| 6,510,406 | B1 | 1/2003 | Marchisio |
| 6,519,580 | B1 | 2/2003 | Johnson et al. |
| 6,523,026 | B1 | 2/2003 | Gillis |
| 6,523,063 | B1 | 2/2003 | Miller et al. |
| 6,542,889 | B1 | 4/2003 | Aggarwal et al. |
| 6,544,123 | B1 | 4/2003 | Tanaka et al. |
| 6,549,957 | B1 | 4/2003 | Hanson et al. |
| 6,560,597 | B1 | 5/2003 | Dhillon et al. |
| 6,571,225 | B1 | 5/2003 | Oles et al. |
| 6,584,564 | B2 | 6/2003 | Olkin et al. |
| 6,594,658 | B2 | 7/2003 | Woods |
| 6,598,054 | B2 | 7/2003 | Schuetze et al. |
| 6,606,625 | B1 | 8/2003 | Muslea et al. |
| 6,611,825 | B1 | 8/2003 | Billheimer et al. |
| 6,628,304 | B2 | 9/2003 | Mitchell et al. |
| 6,629,097 | B1 | 9/2003 | Keith |
| 6,640,009 | B2 | 10/2003 | Zlotnick |
| 6,651,057 | B1 | 11/2003 | Jin et al. |
| 6,654,739 | B1 | 11/2003 | Apte et al. |
| 6,658,423 | B1 | 12/2003 | Pugh et al. |
| 6,675,159 | B1 | 1/2004 | Lin et al. |
| 6,675,164 | B2 | 1/2004 | Kamath et al. |
| 6,678,705 | B1 | 1/2004 | Berchtold et al. |
| 6,684,205 | B1 | 1/2004 | Modha et al. |
| 6,697,998 | B1 | 2/2004 | Damerau et al. |
| 6,701,305 | B1 | 3/2004 | Holt et al. |
| 6,711,585 | B1 | 3/2004 | Copperman et al. |
| 6,714,929 | B1 | 3/2004 | Micaelian et al. |
| 6,735,578 | B2 | 5/2004 | Shetty et al. |
| 6,738,759 | B1 | 5/2004 | Wheeler et al. |
| 6,747,646 | B2 | 6/2004 | Gueziec et al. |
| 6,751,628 | B2 | 6/2004 | Coady |
| 6,757,646 | B2 | 6/2004 | Marchisio |
| 6,785,679 | B1 | 8/2004 | Dane et al. |
| 6,804,665 | B2 | 10/2004 | Kreulen et al. |
| 6,816,175 | B1 | 11/2004 | Hamp et al. |
| 6,819,344 | B2 | 11/2004 | Robbins |
| 6,823,333 | B2 | 11/2004 | McGreevy |
| 6,841,321 | B2 | 1/2005 | Matsumoto et al. |
| 6,847,966 | B1 | 1/2005 | Sommer et al. |
| 6,862,710 | B1 | 3/2005 | Marchisio |
| 6,879,332 | B2 | 4/2005 | Decombe |
| 6,883,001 | B2 | 4/2005 | Abe |
| 6,886,010 | B2 | 4/2005 | Kostoff |
| 6,888,584 | B2 | 5/2005 | Suzuki et al. |
| 6,915,308 | B1 | 7/2005 | Evans et al. |
| 6,922,699 | B2 | 7/2005 | Schuetze et al. |
| 6,941,325 | B1 | 9/2005 | Benitez et al. |
| 6,970,881 | B1 | 11/2005 | Mohan et al. |
| 6,978,419 | B1 | 12/2005 | Kantrowitz |
| 6,990,238 | B1 | 1/2006 | Saffer et al. |
| 6,993,535 | B2 | 1/2006 | Bolle et al. |
| 6,996,575 | B2 | 2/2006 | Cox et al. |
| 7,003,551 | B2 | 2/2006 | Malik |
| 7,013,435 | B2 | 3/2006 | Gallo et al. |
| 7,020,645 | B2 | 3/2006 | Bisbee et al. |
| 7,039,856 | B2 | 5/2006 | Peairs et al. |
| 7,051,017 | B2 | 5/2006 | Marchisio |
| 7,054,870 | B2 | 5/2006 | Holbrook |
| 7,080,320 | B2 | 7/2006 | Ono |
| 7,096,431 | B2 | 8/2006 | Tambata et al. |
| 7,099,819 | B2 | 8/2006 | Sakai et al. |
| 7,107,266 | B1 | 9/2006 | Breyman et al. |
| 7,117,151 | B2 | 10/2006 | Iwahashi et al. |

(56) References Cited

U.S. PATENT DOCUMENTS

| | | |
|---|---|---|
| 7,117,246 B2 | 10/2006 | Christenson et al. |
| 7,130,807 B1 | 10/2006 | Mikurak |
| 7,137,075 B2 | 11/2006 | Hoshito et al. |
| 7,139,739 B2 | 11/2006 | Agrafiotis et al. |
| 7,146,361 B2 | 12/2006 | Broder et al. |
| 7,155,668 B2 | 12/2006 | Holland et al. |
| 7,188,107 B2 | 3/2007 | Moon et al. |
| 7,188,117 B2 | 3/2007 | Farahat et al. |
| 7,194,458 B1 | 3/2007 | Micaelian et al. |
| 7,194,483 B1 | 3/2007 | Mohan et al. |
| 7,197,497 B2 | 3/2007 | Cossock |
| 7,209,949 B2 | 4/2007 | Mousseau et al. |
| 7,233,886 B2 | 6/2007 | Wegerich et al. |
| 7,233,940 B2 | 6/2007 | Bamberger et al. |
| 7,239,986 B2 | 7/2007 | Golub et al. |
| 7,240,199 B2 | 7/2007 | Tomkow |
| 7,246,113 B2 | 7/2007 | Cheetham et al. |
| 7,251,637 B1 | 7/2007 | Caid et al. |
| 7,266,365 B2 | 9/2007 | Ferguson et al. |
| 7,266,545 B2 | 9/2007 | Bergman et al. |
| 7,269,598 B2 | 9/2007 | Marchisio |
| 7,271,801 B2 | 9/2007 | Toyozawa et al. |
| 7,277,919 B1 | 10/2007 | Dohono et al. |
| 7,325,127 B2 | 1/2008 | Olkin et al. |
| 7,353,204 B2 | 4/2008 | Liu |
| 7,359,894 B1 | 4/2008 | Liebman et al. |
| 7,363,243 B2 | 4/2008 | Arnett et al. |
| 7,366,759 B2 | 4/2008 | Trevithick et al. |
| 7,373,612 B2 | 5/2008 | Risch et al. |
| 7,376,635 B1 | 5/2008 | Porcari et al. |
| 7,379,913 B2 | 5/2008 | Steele et al. |
| 7,383,282 B2 | 6/2008 | Whitehead et al. |
| 7,401,087 B2 | 7/2008 | Copperman et al. |
| 7,412,462 B2 | 8/2008 | Margolus et al. |
| 7,418,397 B2 | 8/2008 | Kojima et al. |
| 7,430,717 B1 | 9/2008 | Spangler |
| 7,433,893 B2 | 10/2008 | Lowry |
| 7,440,662 B2 | 10/2008 | Antona et al. |
| 7,444,356 B2 | 10/2008 | Calistri-Yeh et al. |
| 7,457,948 B1 | 11/2008 | Bilicksa et al. |
| 7,472,110 B2 | 12/2008 | Achlioptas |
| 7,490,092 B2 | 2/2009 | Morton et al. |
| 7,509,256 B2 | 3/2009 | Iwahashi et al. |
| 7,516,419 B2 | 4/2009 | Petro et al. |
| 7,523,349 B2 | 4/2009 | Barras |
| 7,558,769 B2 | 7/2009 | Scott et al. |
| 7,571,177 B2 | 8/2009 | Damle |
| 7,574,409 B2 | 8/2009 | Patinkin |
| 7,584,221 B2 | 9/2009 | Robertson et al. |
| 7,639,868 B1 | 12/2009 | Regli et al. |
| 7,640,219 B2 | 12/2009 | Perrizo |
| 7,647,345 B2 | 1/2010 | Trespess et al. |
| 7,668,376 B2 | 2/2010 | Lin et al. |
| 7,698,167 B2 | 4/2010 | Batham et al. |
| 7,716,223 B2 | 5/2010 | Haveliwala et al. |
| 7,743,059 B2 | 6/2010 | Chan et al. |
| 7,761,447 B2 | 7/2010 | Brill et al. |
| 7,801,841 B2 | 9/2010 | Mishra et al. |
| 7,885,901 B2 | 2/2011 | Hull et al. |
| 7,971,150 B2 | 6/2011 | Raskutti et al. |
| 8,010,466 B2 | 8/2011 | Patinkin |
| 8,010,534 B2 | 8/2011 | Roitblat et al. |
| 8,165,974 B2 | 4/2012 | Privault et al. |
| 2002/0032735 A1 | 3/2002 | Burnstein et al. |
| 2002/0065912 A1 | 5/2002 | Catchpole et al. |
| 2002/0078044 A1 | 6/2002 | Song et al. |
| 2002/0078090 A1 | 6/2002 | Hwang et al. |
| 2002/0122543 A1 | 9/2002 | Rowen |
| 2002/0184193 A1 | 12/2002 | Cohen |
| 2003/0046311 A1 | 3/2003 | Baidya et al. |
| 2003/0130991 A1 | 7/2003 | Reijerse et al. |
| 2003/0172048 A1 | 9/2003 | Kauffman |
| 2003/0174179 A1 | 9/2003 | Suermondt et al. |
| 2004/0024739 A1* | 2/2004 | Copperman et al. ............ 707/1 |
| 2004/0024755 A1 | 2/2004 | Rickard |
| 2004/0034633 A1 | 2/2004 | Rickard |
| 2004/0205482 A1 | 10/2004 | Basu et al. |
| 2004/0205578 A1 | 10/2004 | Wolf et al. |
| 2004/0215608 A1 | 10/2004 | Gourlay |
| 2004/0243556 A1 | 12/2004 | Ferrucci et al. |
| 2005/0025357 A1 | 2/2005 | Landwehr et al. |
| 2005/0097435 A1 | 5/2005 | Prakash et al. |
| 2005/0171772 A1 | 8/2005 | Iwahashi et al. |
| 2005/0203924 A1 | 9/2005 | Rosenberg |
| 2005/0283473 A1 | 12/2005 | Rousso et al. |
| 2006/0008151 A1 | 1/2006 | Lin et al. |
| 2006/0021009 A1 | 1/2006 | Lunt |
| 2006/0053382 A1 | 3/2006 | Gardner et al. |
| 2006/0122974 A1 | 6/2006 | Perisic |
| 2006/0122997 A1 | 6/2006 | Lin |
| 2007/0020642 A1 | 1/2007 | Deng et al. |
| 2007/0043774 A1 | 2/2007 | Davis et al. |
| 2007/0044032 A1 | 2/2007 | Mollitor et al. |
| 2007/0112758 A1 | 5/2007 | Livaditis |
| 2007/0150801 A1 | 6/2007 | Chidlovskii et al. |
| 2007/0214133 A1 | 9/2007 | Liberty et al. |
| 2007/0288445 A1 | 12/2007 | Kraftsow |
| 2008/0005081 A1 | 1/2008 | Green et al. |
| 2008/0140643 A1 | 6/2008 | Ismalon |
| 2008/0183855 A1 | 7/2008 | Agarwal et al. |
| 2008/0189273 A1 | 8/2008 | Kraftsow |
| 2008/0215427 A1 | 9/2008 | Kawada et al. |
| 2008/0228675 A1 | 9/2008 | Duffy et al. |
| 2009/0041329 A1 | 2/2009 | Nordell et al. |
| 2009/0043797 A1 | 2/2009 | Dorie et al. |
| 2009/0049017 A1 | 2/2009 | Gross |
| 2009/0097733 A1 | 4/2009 | Hero et al. |
| 2009/0106239 A1 | 4/2009 | Getner et al. |
| 2009/0222444 A1 | 9/2009 | Chowdhury et al. |
| 2009/0228499 A1 | 9/2009 | Schmidtler et al. |
| 2009/0228811 A1 | 9/2009 | Adams et al. |
| 2010/0100539 A1 | 4/2010 | Davis et al. |
| 2010/0198802 A1 | 8/2010 | Kraftsow |
| 2010/0250477 A1 | 9/2010 | Yadav |
| 2010/0262571 A1 | 10/2010 | Schmidtler et al. |
| 2010/0268661 A1 | 10/2010 | Levy et al. |
| 2012/0124034 A1 | 5/2012 | Jing et al. |

FOREIGN PATENT DOCUMENTS

| | | |
|---|---|---|
| EP | 0886227 | 10/2003 |
| WO | WO 0067162 | 11/2000 |
| WO | 03052627 | 6/2003 |
| WO | 03060766 | 7/2003 |
| WO | WO 2005073881 | 8/2005 |
| WO | 2006008733 | 1/2006 |

OTHER PUBLICATIONS

McNee, "Meeting User Information Needs in Recommender Systems," Ph.D. Dissertation, University of Minnesota—Twin Cities, Jun. 2006.

Anna Sachinopoulou, "Multidimensional Visualization," Technical Research Centre of Finland, ESPOO 2001, VTT Research Notes 2114, pp. 1-37 (2001).

B.B. Hubbard, "The World According the Wavelet: The Story of a Mathematical Technique in the Making," AK Peters (2nd ed.), pp. 227-229, Massachusetts, USA (1998).

Baeza-Yates et al., "Modern Information Retrieval," Ch. 2 "Modeling," Modern Information Retrieval, Harlow: Addison-Wesley, Great Britain 1999, pp. 18-71 (1999).

Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809 (2003).

Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).

Boukhelifa et al., "A Model and Software System for Coordinated and Multiple Views in Exploratory Visualization," Information Visualization, No. 2, pp. 258-269, GB (2003).

(56) References Cited

OTHER PUBLICATIONS

Chung et al., "Thematic Mapping—From Unstructured Documents to Taxonomies," CIKM'02, Nov. 4-9, 2002, pp. 608-610, ACM, McLean, Virginia, USA (Nov. 4, 2002).

Davison et al., "Brute Force Estimation of the Number of Human Genes Using EST Clustering as a Measure," IBM Journal of Research & Development, vol. 45, pp. 439-447 (May 2001).

Eades et al. "Multilevel Visualization of Clustered Graphs," Department of Computer Science and Software Engineering, University of Newcastle, Australia, Proceedings of Graph Drawing '96, Lecture Notes in Computer Science, NR. 1190 (Sep. 1996).

Estivill-Castro et al. "Amoeba: Hierarchical Clustering Based on Spatial Proximity Using Delaunaty Diagram", Department of Computer Science, The University of Newcastle, Australia, 1999 ACM Sigmod International Conference on Management of Data, vol. 28, No. 2, Jun. 1, 1999, Jun. 3, 1999, pp. 49-60, Philadelphia, PA, USA (Jun. 1999).

F. Can, Incremental Clustering For Dynamic Information Processing: ACM Transactions On Information Systems, ACM, New York, NY, US, vol. 11, No. 2, pp. 143-164, XP-002308022 (Apr. 1993).

Fekete et al., "Excentric Labeling: Dynamic Neighborhood Labeling For Data Visualization," CHI 1999 Conference Proceedings Human Factors In Computing Systems, Pittsburgh, PA, pp. 512-519 (May 15-20, 1999).

Jain et al., "Data Clustering: A Review," ACM Computing Surveys, vol. 31, No. 3, Sep. 1999, pp. 264-323, New York, NY, USA (Sep. 1999).

Kanungo et al., "The Analysis Of A Simple K-Means Clustering Algorithm," pp. 100-109, PROC 16th annual symposium of computational geometry (May 2000).

M. Kurimo, "Fast Latent Semantic Indexing of Spoken Documents by Using Self-Organizing Maps" IEEE International Conference on Accoustics, Speech, And Signal Processing, vol. 6, pp. 2425-2428 (Jun. 2000).

Lio et al., "Funding Pathogenicity Islands And Gene Transfer Events in Genome Data," Bioinformatics, vol. 16, pp. 932-940, Department of Zoology, University of Cambridge, UK (Jan. 25, 2000).

Artero et al., "Viz3D: Effective Exploratory Visualization of Large Multidimensional Data Sets," IEEE Computer Graphics and Image Processing, pp. 340-347 (Oct. 20, 2004).

Magarshak, Theory & Practice. Issue 01. May 17, 2000. http://www.flipcode.com/articles/tp.sub.--issue01-pf.shtml (May 17, 2000).

Maria Cristin Ferreira De Oliveira et al., "From Visual Data Exploration to Visual Data Mining: A Survey," Jul.-Sep. 2003, IEEE Transactions on Visualization and Computer Graphics, vol. 9, No. 3, pp. 378-394 (Jul. 2003).

Slaney et al., "Multimedia Edges: Finding Hierarchy in all Dimensions" PROC. 9-th ACM Intl. Conf. on Multimedia, pp. 29-40, ISBN. 1-58113-394-4, Sep. 30, 2001, XP002295016 OTTAWA (Sep. 30, 2001).

Strehl et al., "Cluster Ensembles—A Knowledge Reuse Framework for Combining Partitioning," Journal of Machine Learning Research, MIT Press, Cambridge, MA, US, ISSN: 1533-7928, vol. 3, No. 12, pp. 583-617, XP002390603 (Dec. 2002).

V. Faber, "Clustering and the Continuous K-Means Algorithm," Los Alamos Science, The Laboratory, Los Alamos, NM, US, No. 22, Jan. 1, 1994, pp. 138-144 (Jan. 1, 1994).

Wang et al., "Learning text classifier using the domain concept hierarchy," Communications, Circuits and Systems and West Sino Expositions, IEEE 2002 International Conference on Jun. 29-Jul. 1, 2002, Piscataway, NJ, USA, IEEE, vol. 2, pp. 1230-1234 (2002).

Whiting et al., "Image Quantization: Statistics and Modeling," SPIE Conference of Physics of Medical Imaging, San Diego, CA, USA, vol. 3336, pp. 260-271 (Feb. 1998).

S.S. Weng, C.K. Liu, "Using text classification and multiple concepts to answer e-mails." Expert Systems with Applications, 26 (2004), pp. 529-543.

* cited by examiner

SYSTEM AND METHOD FOR DISPLAYING RELATIONSHIPS BETWEEN CONCEPTS TO PROVIDE CLASSIFICATION SUGGESTIONS VIA NEAREST NEIGHBOR

CROSS-REFERENCE TO RELATED APPLICATION

This non-provisional patent application claims priority under 35 U.S.C. §119(e) to U.S. Provisional Patent Application Ser. No. 61/229,216, filed Jul. 28, 2009, and U.S. Provisional Patent Application Ser. No. 61/236,490, filed Aug. 24, 2009, the disclosures of which are incorporated by reference.

FIELD

This application relates in general to using documents as a reference point and, in particular, to a system and method for displaying relationships between concepts to provide classification suggestions via nearest neighbor.

BACKGROUND

Historically, document review during the discovery phase of litigation and for other types of legal matters, such as due diligence and regulatory compliance, have been conducted manually. During document review, individual reviewers, generally licensed attorneys, are assigned sets of documents for coding. A reviewer must carefully study each document and categorize the document by assigning a code or other marker from a set of descriptive classifications, such as "privileged," "responsive," and "non-responsive." The classifications can affect the disposition of each document, including admissibility into evidence.

During discovery, document review can potentially affect the outcome of the underlying legal matter, so consistent and accurate results are crucial. Manual document review is tedious and time-consuming. Marking documents is solely at the discretion of each reviewer and inconsistent results may occur due to misunderstanding, time pressures, fatigue, or other factors. A large volume of documents reviewed, often with only limited time, can create a loss of mental focus and a loss of purpose for the resultant classification. Each new reviewer also faces a steep learning curve to become familiar with the legal matter, classification categories, and review techniques.

Currently, with the increasingly widespread movement to electronically stored information (ESI), manual document review is no longer practicable. The often exponential growth of ESI exceeds the bounds reasonable for conventional manual human document review and underscores the need for computer-assisted ESI review tools.

Conventional ESI review tools have proven inadequate to providing efficient, accurate, and consistent results. For example, DiscoverReady LLC, a Delaware limited liability company, custom programs ESI review tools, which conduct semi-automated document review through multiple passes over a document set in ESI form. During the first pass, documents are grouped by category and basic codes are assigned. Subsequent passes refine and further assign codings. Multiple pass review requires a priori project-specific knowledge engineering, which is only useful for the single project, thereby losing the benefit of any inferred knowledge or know-how for use in other review projects.

Thus, there remains a need for a system and method for increasing the efficiency of document review that bootstraps knowledge gained from other reviews while ultimately ensuring independent reviewer discretion.

SUMMARY

Document review efficiency can be increased by identifying relationships between reference documents and uncoded documents and providing a suggestion for classification based on the relationships. The uncoded documents for a document review project are identified and clustered. At least one of the uncoded documents is selected from the clusters and compared with the reference set based on a similarity metric. The reference documents most similar to the selected uncoded document are identified. Classification codes assigned to the similar reference documents can be used to provide suggestions for classification of the selected uncoded document. Further, a machine-generated suggestion for a classification codes can be provided with a confidence level.

An embodiment provides a system and method for displaying relationships between concepts to provide classification suggestions via nearest neighbor. Reference concepts previously classified and a set of uncoded concepts are provided. At least one uncoded concept is compared with the reference concepts. One or more of the reference concepts that are similar to the at least one uncoded concept are identified. Relationships between the at least one uncoded concept and the similar reference concept are depicted on a display for classifying the at least one uncoded concept.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
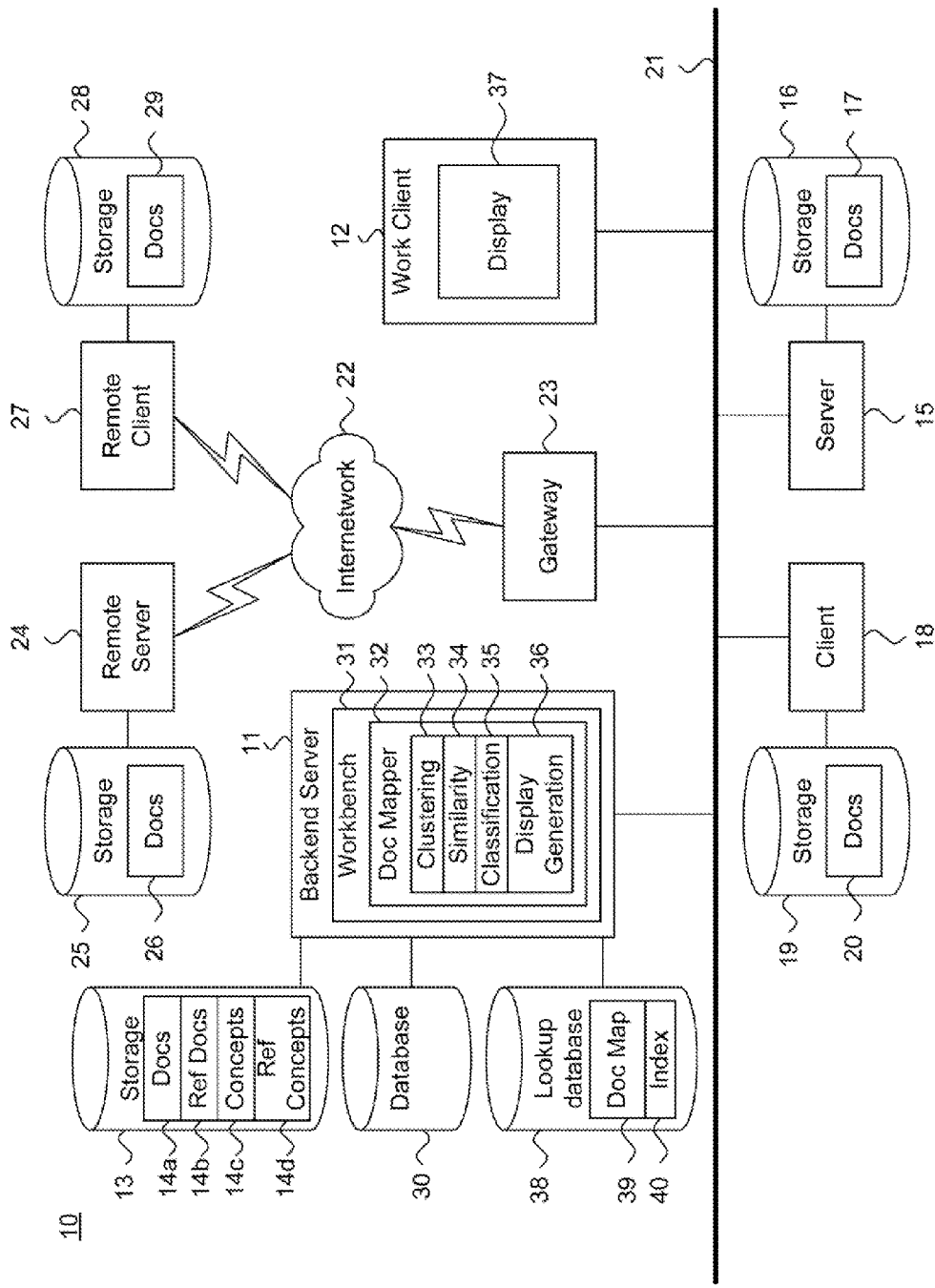
FIG. 1 is a block diagram showing a system for displaying relationships between concepts to provide classification suggestions via nearest neighbor, in accordance with one embodiment.

The ever-increasing volume of ESI underlies the need for automating document review for improved consistency and throughput. Token clustering via injection utilizes reference, or previously classified tokens, which offer knowledge gleaned from earlier work in similar legal projects, as well as a reference point for classifying uncoded tokens.

The tokens can include word-level, symbol-level, or character-level n-grams, raw terms, entities, or concepts. Other tokens, including other atomic parse-level elements, are possible. An n-gram is a predetermined number of items selected from a source. The items can include syllables, letters, or words, as well as other items. A raw term is a term that has not been processed or manipulated. Entities further refine nouns and noun phrases into people, places, and things, such as meetings, animals, relationships, and various other objects. Additionally, entities can represent other parts of grammar associated with semantic meanings to disambiguate different instances or occurrences of the grammar. Entities can be extracted using entity extraction techniques known in the field.

Concepts are collections of nouns and noun-phrases with common semantic meaning that can be extracted from ESI, including documents, through part-of-speech tagging. Each concept can represent one or more documents to be classified during a review. Clustering of the concepts provides an overall view of the document space, which allows users to easily identify documents sharing a common theme.

The clustering of tokens, for example, concepts, differs from document clustering, which groups related documents individually. In contrast, concept clustering groups related concepts, which are each representative of one or more related documents. Each concept can express an ideas or topic that may not be expressed by individual documents. A concept is analogous to a search query by identifying documents associated with a particular idea or topic.

A user can determine how particular concepts are related based on the concept clustering. Further, users are able to intuitively identify documents by selecting one or more associated concepts in a cluster. For example, a user may wish to identify all documents in a particular corpus that are related to car manufacturing. The user can select the concept "car manufacturing" or "vehicle manufacture" within one of the clusters and subsequently, the associated documents are presented. However, during document clustering, a user is first required to select a specific document from which other documents that are similarly related can then be identified.

Providing Suggestions Using Reference Concepts

Reference concepts are concepts that have been previously classified and can be used to influence classification of uncoded, that is unclassified, concepts. Specifically, relationships between the uncoded concepts and the reference concepts can be visually depicted to provide suggestions, for instance to a human reviewer, for classifying the visually-proximal uncoded concepts. Although tokens, such as word-level or character-level n-grams, raw terms, entities, or concepts, can be clustered and displayed, the discussion below will focus on a concept as a particular token.

Complete concept review requires a support environment within which classification can be performed. FIG. 1 is a block diagram showing a system 10 for displaying relationships between concepts to provide classification suggestions via nearest neighbor, in accordance with one embodiment. By way of illustration, the system 10 operates in a distributed computing environment, which includes a plurality of heterogeneous systems and ESI sources. Henceforth, a single item of ESI will be referenced as a "document," although ESI can include other forms anon-document data, as described infra. A backend server 11 is coupled to a storage device 13, which stores documents 14a, such as uncoded documents, in the form of structured or unstructured data, a database 30 for maintaining information about the documents, a lookup database 38 for storing many-to-many mappings 39 between documents and document features, such as concepts, and a concept document index 40, which maps documents to concepts. The storage device 13 also stores classified documents 14b, concepts 14c, and reference concepts 14d. Concepts are collections of nouns and noun-phrases with common semantic meaning. The nouns and noun-phrases can be extracted from one or more documents in the corpus for review. Thus, a single concept can be representative of one or more documents. The reference concepts 14d are each associated with an assigned classification code and considered as classified or coded. Hereinafter, the terms "classified" and "coded" are used interchangeably with the same intended meaning, unless otherwise indicated. A set of reference concepts can be hand-selected or automatically selected through guided review, which is further discussed below. Additionally, the set of reference concepts can be predetermined or can be generated dynamically, as the selected uncoded concepts are classified and subsequently added to the set of reference concepts.

The backend server 11 is coupled to an intranetwork 21 and executes a workbench suite 31 for providing a user interface framework for automated document management, processing, analysis, and classification. In a further embodiment, the backend server 11 can be accessed via an internetwork 22. The workbench software suite 31 includes a document mapper 32 that includes a clustering engine 33, similarity searcher 34, classifier 35, and display generator 36. Other workbench suite modules are possible.

The clustering engine 33 performs efficient concept scoring and clustering of documents, including uncoded and coded documents. Efficient scoring and clustering is described in commonly-assigned U.S. Pat. No. 7,610,313, the disclosure of which is incorporated by reference. Clusters of uncoded concepts 14a can be formed and organized along vectors, known as spines, based on a similarity of the clusters, which can be expressed in terms of distance. During clustering, groupings of related concepts are provided.

In one embodiment, the clusters can include uncoded and coded concepts, which are generated based on a similarity measure, as discussed in commonly-owned U.S. Patent Application Publication No. 2011/0029531, published Feb. 3, 2011, pending, and U.S. Patent Application Publication No. 2011/0029530, published Feb. 3, 2011, pending, the disclosures of which are incorporated by reference.

Figure 4:
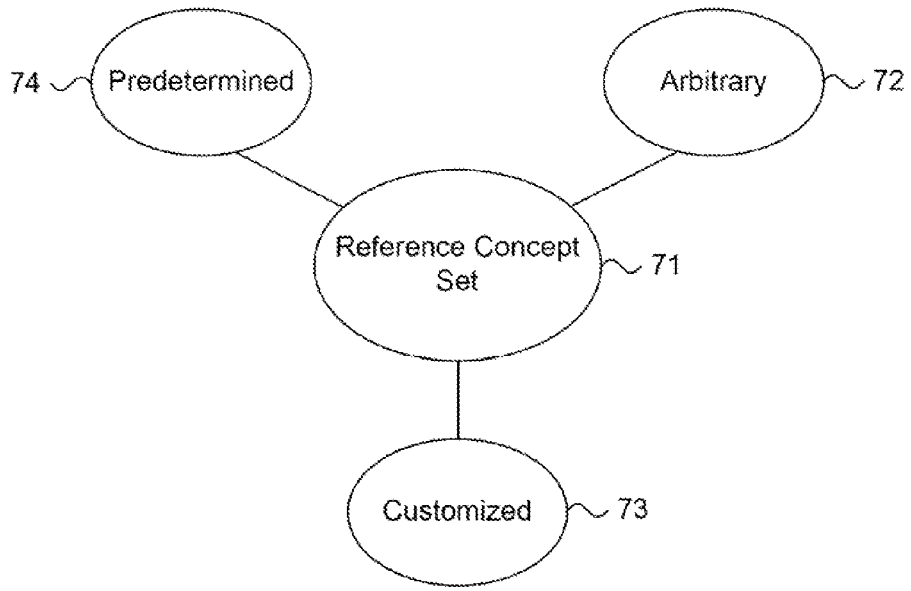
FIG. 4 is a block diagram showing, by way of example, measures for selecting a concept reference subset.

The similarity searcher 34 identifies the reference concepts 14d that are most similar to selected uncoded concepts 14c, clusters, or spines, as further described below with reference to FIG. 4. For example, the uncoded concepts, reference concepts, clusters, and spines can each be represented by a score vector, which includes paired values consisting of a token, such as a term occurring in that concept, cluster or spine, and the associated score for that token. Subsequently, the score vector of the uncoded concept, cluster, or spine is then compared with the score vectors of the reference concepts to identify similar reference concepts.

Figure 8:
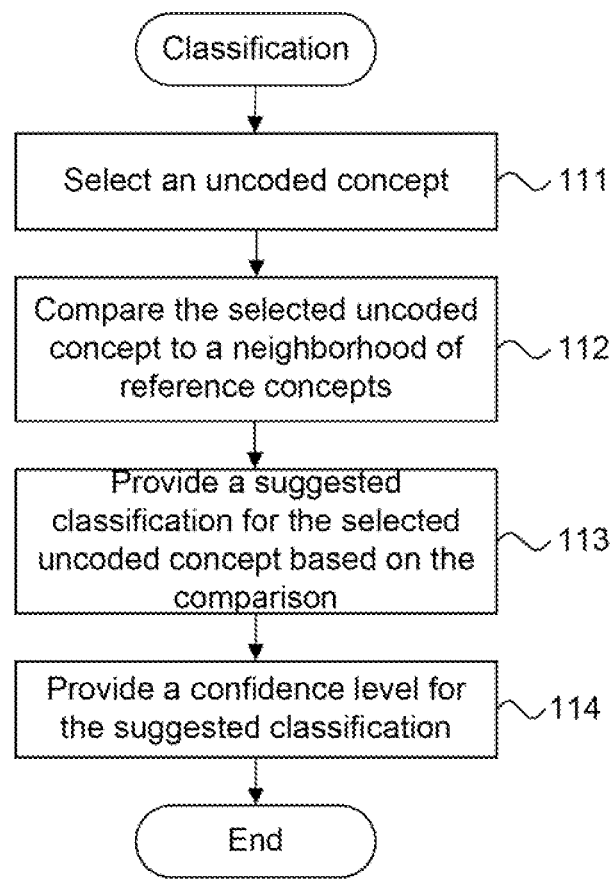
FIG. 8 is a process flow diagram showing, by way of example, a method for classifying uncoded concepts for use in the method of FIG. 2.

The classifier 35 provides a machine-generated suggestion and confidence level for classification of selected uncoded concepts 14d, clusters, or spines, as further described below with reference to FIG. 8. The display generator 36 arranges the clusters and spines in thematic relationships in a two-dimensional visual display space, as further described below beginning with reference to FIG. 5. Once generated, the visual display space is transmitted to a work client 12 by the backend server 11 via the document mapper 32 for presenting to a reviewer on a display 37. The reviewer can include an individual person who is assigned to review and classify one or more uncoded documents by designating a code. Hereinafter, the terms "reviewer" and "custodian" are used interchangeably with the same intended meaning, unless otherwise indicated. Other types of reviewers are possible, including machine-implemented reviewers.

The document mapper 32 operates on uncoded 14c and coded concepts 14d, which can be retrieved from the storage 13, as well as from a plurality of local and remote sources. The local sources include a local server 15, which is coupled to a storage device 16 with documents and concepts 17, and a local client 18, which is coupled to a storage device 19 with documents and concepts 20. The local server 15 and local client 18 are interconnected to the backend server 11 and the work client 12 over an intranetwork 21. In addition, the document mapper 32 can identify and retrieve concepts from remote sources over an internetwork 22, including the Internet, through a gateway 23 interfaced to the intranetwork 21. The remote sources include a remote server 24, which is coupled to a storage device 25 with documents and concepts 26, and a remote client 27, which is coupled to a storage device 28 with documents and concepts 29. Other document sources, either local or remote, are possible.

The individual documents 17, 20, 26, 29 include all forms and types of structured and unstructured ESI, including electronic message stores, word processing documents, electronic mail (email) folders, Web pages, and graphical or multimedia data. Notwithstanding, the documents could be in the form of structurally organized data, such as stored in a spreadsheet or database.

In one embodiment, the individual documents 14a, 14b, 17, 20, 26, 29 include electronic message folders storing email and attachments, such as maintained by the Outlook and Outlook Express products, licensed by Microsoft Corporation, Redmond, Wash. The database can be an SQL-based relational database, such as the Oracle database management system, Release 8, licensed by Oracle Corporation, Redwood Shores, Calif.

Additionally, the individual concepts 14c, 14d, 17, 20, 26, 29 include uncoded concepts and reference concepts. The uncoded concepts, which are unclassified, represent collections of nouns and noun-phrases that are semantically related and extracted from documents in a document review project.

The reference concepts are initially uncoded concepts that can represent documents selected from the corpus or other sources of documents. The reference concepts assist in providing suggestions for classification of the remaining uncoded concepts representative of the document corpus based on visual relationships between the uncoded concepts and reference concepts. The reviewer can classify one or more of the remaining uncoded concepts by assigning a classification code based on the relationships. In a further embodiment, the reference concepts can be used as a training set to form machine-generated suggestions for classifying the remaining uncoded concepts, as further described below with reference to FIG. 8.

The document corpus for a document review project can be divided into subsets of documents, which are each provided to a particular reviewer as an assignment. The uncoded documents are analyzed to identify concepts, which are subsequently clustered. A classification code can be assigned to each of the clustered concepts. To maintain consistency, the same codes can be used across all concepts representing assignments in the document review project. The classification codes can be determined using taxonomy generation, during which a list of classification codes can be provided by a reviewer or determined automatically. The classification code of a concept can be assigned to the documents associated with that concept.

For purposes of legal discovery, the list of classification codes can include "privileged," "responsive," or "non-responsive," however, other classification codes are possible. The assigned classification codes can be used as suggestions for classification of associated documents. For example, a document associated with three concepts, each assigned a "privileged" classification can also be considered "privileged." Other types of suggestions are possible. A "privileged" document contains information that is protected by a privilege, meaning that the document should not be disclosed or "produced" to an opposing party. Disclosing a "privileged" document can result in an unintentional waiver of the subject matter disclosed. A "responsive" document contains information that is related to the legal matter, while a "non-responsive" document includes information that is not related to the legal matter.

The system 10 includes individual computer systems, such as the backend server 11, work server 12, server 15, client 18, remote server 24 and remote client 27. The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Figure 2:
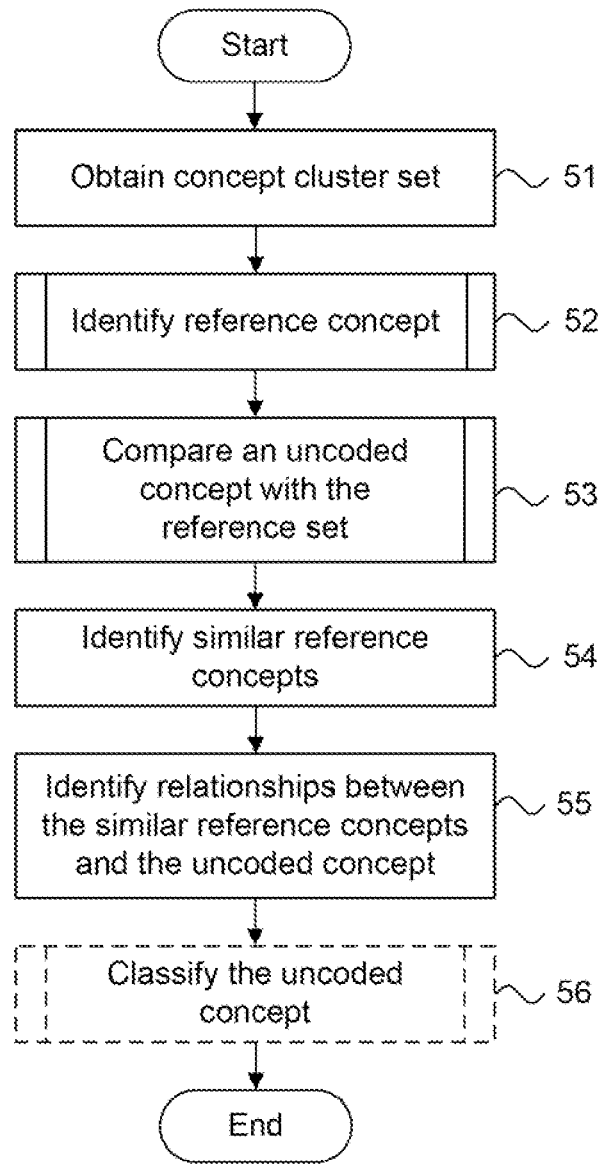
FIG. 2 is a process flow diagram showing a method for displaying relationships between concepts to provide classification suggestions via nearest neighbor, in accordance with one embodiment.

Identifying relationships between the reference concepts and uncoded concepts includes clustering and similarity measures. FIG. 2 is a process flow diagram showing a method 50 for displaying relationships between concepts to provide classification suggestions via nearest neighbor, in accordance with one embodiment. A set of concept clusters is obtained (block 51). The clusters can include uncoded concepts, and in a further embodiment, the clusters can include uncoded and coded concepts.

Figure 3:
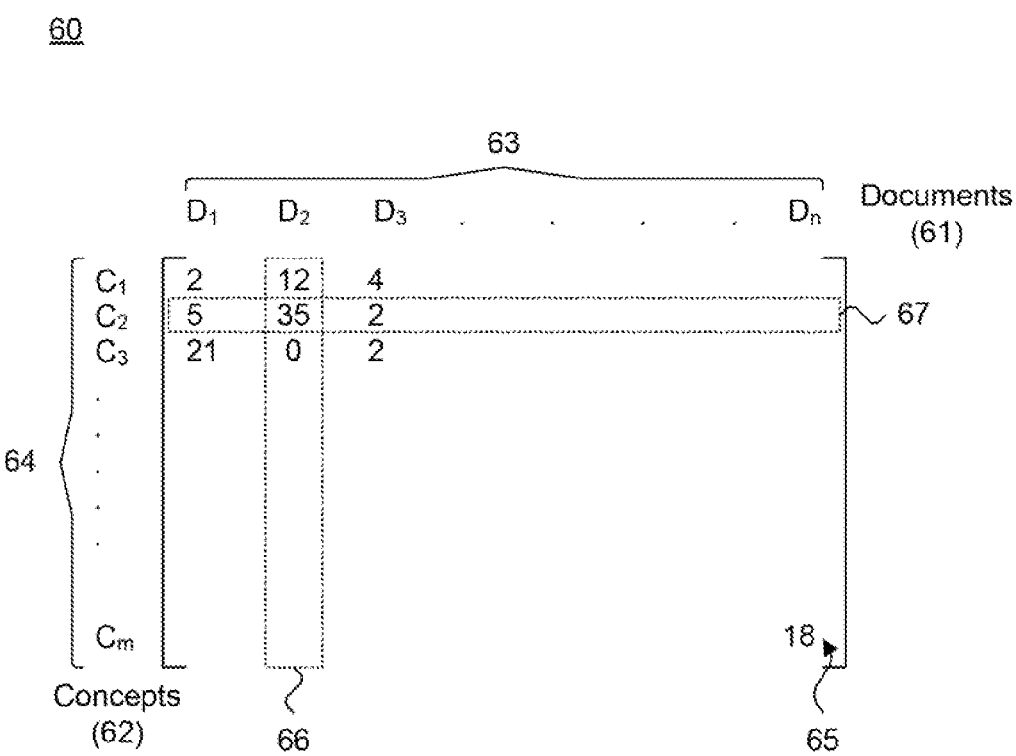
FIG. 3 is a table showing, by way of example, a matrix mapping of uncoded concepts and documents.

Clustering of the concepts provides groupings of related concepts and is based on a similarity metric using score vectors assigned to each concept. The score vectors can be generated using a matrix showing the concepts in relation to documents that contain the concepts. FIG. 3 is a table showing, by way of example, a matrix mapping 60 of concepts 64 and documents 63. The documents 63 are listed along a horizontal dimension 61 of the matrix, while the concepts 64 are listed along a vertical dimension 62. However, the placement of the documents 63 and concepts 64 can be reversed. Each cell 65 within the matrix 60 includes a cumulative number of occurrences of each concept within a particular document 63. Score vectors can be generated for each document by identifying the concepts and associated weights within that document and ordering the concepts along a vector with the associated concept weight. In the matrix 60, the score vector 66 for a document 63 can be identified as all the concepts included in that document and the associated weights, which are based on the number of occurrences of each concept. Score vectors can also be generated for each concept by identifying the documents that contain that concept and determining a weight associated with each document. The documents and associated weights are then ordered along a vector for each concept, as the concept score vector. In the matrix 60, the score vector 67 for a concept can be identified as all the documents that contain that concept and the associated weights.

In one embodiment, the clustered uncoded concepts can represent a corpus of uncoded concepts representative of a document review project, or one or more concepts representative of at least one assignment of uncoded concepts. The concept corpus can include all uncoded concepts for a document review project, while, each assignment can include a subset of uncoded concepts that are representative of one or more documents selected from the corpus and assigned to a reviewer. The corpus can be divided into assignments using assignment criteria, such as custodian or source of the uncoded concept, content, document type, and date. Other criteria are possible.

Returning to the discussion of FIG. 2, reference concepts can be identified (block 52). The reference concepts can include all reference concepts generated for a document review project, or alternatively, a subset of the reference concepts. Obtaining reference concepts is further discussed below with reference to FIG. 4.

An uncoded concept is selected from one of the clusters in the set and compared against the reference concepts (block 53) to identify one or more reference concepts that are similar to the selected uncoded concept (block 54). The similar reference concepts are identified based on a similarity measure calculated between the selected uncoded concept and each reference concept. Comparing the selected uncoded concept with the reference concepts is further discussed below with reference to FIG. 4. Once identified, relationships between the selected uncoded concept and the similar reference concepts can be identified (block 55) to provide classification hints, including a suggestion for the selected uncoded concept, as further discussed below with reference to FIG. 5. Additionally, machine-generated suggestions for classification can be provided (block 56) with an associated confidence level for use in classifying the selected uncoded concept. Machine-generated suggestions are further discussed below with reference to FIG. 7. Once the selected uncoded concept is assigned a classification code, either by the reviewer or automatically, the newly classified concept can be added to the set of reference concepts for use in classifying further uncoded concepts. Subsequently, a further uncoded concept can be selected for classification using similar reference concepts.

In one embodiment, the classified concepts can be used to classify those documents represented by that concept. For example, in a product liability lawsuit, the plaintiff claims that a wood composite manufactured by the defendant induces and harbors mold growth. During discovery, all documents within the corpus for the lawsuit and relating to mold should be identified for review. The concept for mold is clustered and includes a "responsive" classification code, which indicates that the noun phrase mold is related to the legal matter. Upon selection of the mold concept, all documents that include the noun phrase mold can be identified using the mapping matrix, which is described above with reference to FIG. 3. The responsive classification code assigned to the concept can be used as a suggestion for the document classification. However, if the document is represented by multiple concepts with different classification codes, each different code can be considered during classification of the document.

In a further embodiment, the concept clusters can be used with document clusters, which are described in commonly-owned in U.S. Patent Application Publication No. 2011/0029526, published Feb. 3, 2011, pending, U.S. Patent Publication No. 2011/0029527, published Feb. 3, 2011, pending, the disclosures of which is incorporated by reference. For example, selecting a concept in the concept cluster display can identify one or more documents with a common idea or topic. Further selection of one of the documents represented by the selected cluster in the document concept display can identify documents that are similarly related to the content of the selected document. The identified documents can be the same or different as the other documents represented by the concept.

In an even further embodiment, the documents identified from one of the concepts can be classified automatically as described in commonly-assigned U.S. Patent Application Publication No. 2011/0029525, published Feb. 3, 2011, pending, the disclosure of which is incorporated by reference.

In a further embodiment, similar reference concepts can also be identified for a selected cluster or a selected spine along which the clusters are placed.

Selecting a Concept Reference Subset

After the clusters have been generated, one or more uncoded concepts can be selected from at least one of the clusters for comparing with a reference concept set or subset. FIG. 4 is a block diagram showing, by way of example, measures 70 for selecting a concept reference subset 71. The subset of reference concepts 71 can be previously defined 74 and maintained for related document review projects or can be specifically generated for each review project. A predefined reference subset 74 provides knowledge previously obtained during the related document review project to increase efficiency, accuracy, and consistency. Reference subsets newly generated for each review project can include arbitrary 72 or customized 73 reference subsets that are determined automatically or by a human reviewer. An arbitrary reference subset 72 includes reference concepts randomly selected for inclusion in the reference subset. A customized reference subset 73 includes reference concepts specifically selected for inclusion in the reference subset based on criteria, such as reviewer preference, classification category, document source, content, and review project. Other criteria are possible.

The subset of reference concepts, whether predetermined or newly generated, should be selected from a set of reference concepts that are representative of documents in the document corpus for a review project in which data organization or classification is desired. Guided review assists a reviewer or other user in identifying reference concepts that are representative of the corpus for use in classifying uncoded concepts. During guided review, the uncoded concepts that are dissimilar to all other uncoded concepts are identified based on a similarity threshold. In one embodiment, the dissimilarity can be determined as the cos σ of the score vectors for the uncoded concepts. Other methods for determining dissimilarity are possible. Identifying the dissimilar concepts provides a group of concepts that are representative of the document in a corpus for a review project. Each identified dissimilar concept is then classified by assigning a particular classification code based on the content of the associated documents to collectively generate the reference concepts. Guided review can be performed by a reviewer, a machine, or a combination of the reviewer and machine.

Other methods for generating reference concepts for a document review project using guided review are possible, including clustering. A set of uncoded documents to be classified is clustered, as described in commonly-assigned U.S. Pat. No. 7,610,313, the disclosure of which is incorporated by reference. A plurality of the clustered uncoded concepts are selected based on selection criteria, such as cluster centers or sample clusters. The cluster centers can be used to identify uncoded concepts in a cluster that are most similar or dissimilar to the cluster center. The selected uncoded concepts are then assigned classification codes. In a further embodiment, sample clusters can be used to generate reference concepts by selecting one or more sample clusters based on cluster relation criteria, such as size, content, similarity, or dissimilarity. The uncoded concepts in the selected sample clusters are then selected for classification by assigning classification codes. The classified concepts represent reference concepts for the document review project. The number of reference concepts can be determined automatically or by a reviewer. Other methods for selecting concepts for use as reference concepts are possible.

Comparing a Selected Uncoded Concept to Reference Concepts

Figure 5:
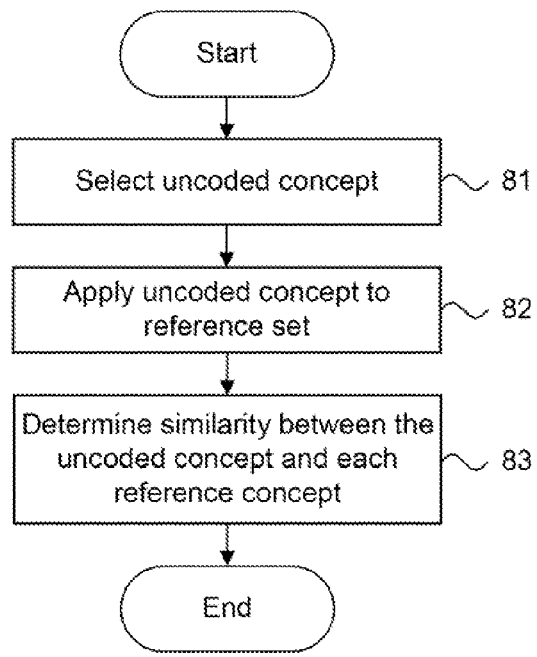
FIG. 5 is a process flow diagram showing, by way of example, a method for comparing an uncoded concept to reference concepts for use in the method of FIG. 2.

An uncoded concept selected from one of the clusters can be compared to the reference concepts to identify similar reference concepts for use in providing suggestions regarding classification of the selected uncoded concept. FIG. 5 is a process flow diagram showing, by way of example, a method 80 for comparing an uncoded concept to reference concepts for use in the method of FIG. 2. The uncoded concept is selected from a cluster (block 81) and applied to the reference concepts (block 82). The reference concepts can include all reference concepts for a document review project or a subset of the reference concepts. Each of the reference concepts and the selected uncoded concept can be represented by a score vector having paired values of documents associated with that concept and associated scores. A similarity between the uncoded concept and each reference concept is determined (block 83) as the cos σ of the score vectors for the uncoded concept and reference concept being compared and is equivalent to the inner product between the score vectors. In the described embodiment, the cos σ is calculated in accordance with the equation:

$$\cos\sigma_{AB} = \frac{\langle \vec{S}_A \cdot \vec{S}_B \rangle}{|\vec{S}_A||\vec{S}_B|}$$

where $\cos\sigma_{AB}$ comprises a similarity between uncoded concept A and reference concept B, $\vec{S}_A$ comprises a score vector for uncoded concept A, and $\vec{S}_B$ comprises a score vector for reference concept B. Other forms of determining similarity using a distance metric are possible, as would be recognized by one skilled in the art, including using Euclidean distance.

One or more of the reference concepts that are most similar to the selected uncoded concept, based on the similarity metric, are identified. The most similar reference concepts can be identified by satisfying a predetermined threshold of similarity. Other methods for determining the similar reference concepts are possible, such as setting a predetermined absolute number of the most similar reference concepts. The classification codes of the identified similar reference concepts can be used as suggestions for classifying the selected uncoded concept, as further described below with reference to FIG. 8. Once identified, the similar reference concepts can be used to provide suggestions regarding classification of the selected uncoded concept, as further described below with reference to FIGS. 6 and 7.

Displaying the Reference Concepts

The similar reference concepts can be displayed with the clusters of uncoded concepts. In the display, the similar reference concepts can be provided as a list, while the clusters can be can be organized along spines of thematically related clusters, as described in commonly-assigned U.S. Pat. No. 7,271,804, the disclosure of which is incorporated by reference. The spines can be positioned in relation to other cluster spines based on a theme shared by those cluster spines, as described in commonly-assigned U.S. Pat. No. 7,610,313, the disclosure of which is incorporated by reference. Other displays of the clusters and similar reference documents are possible.

Figure 6:
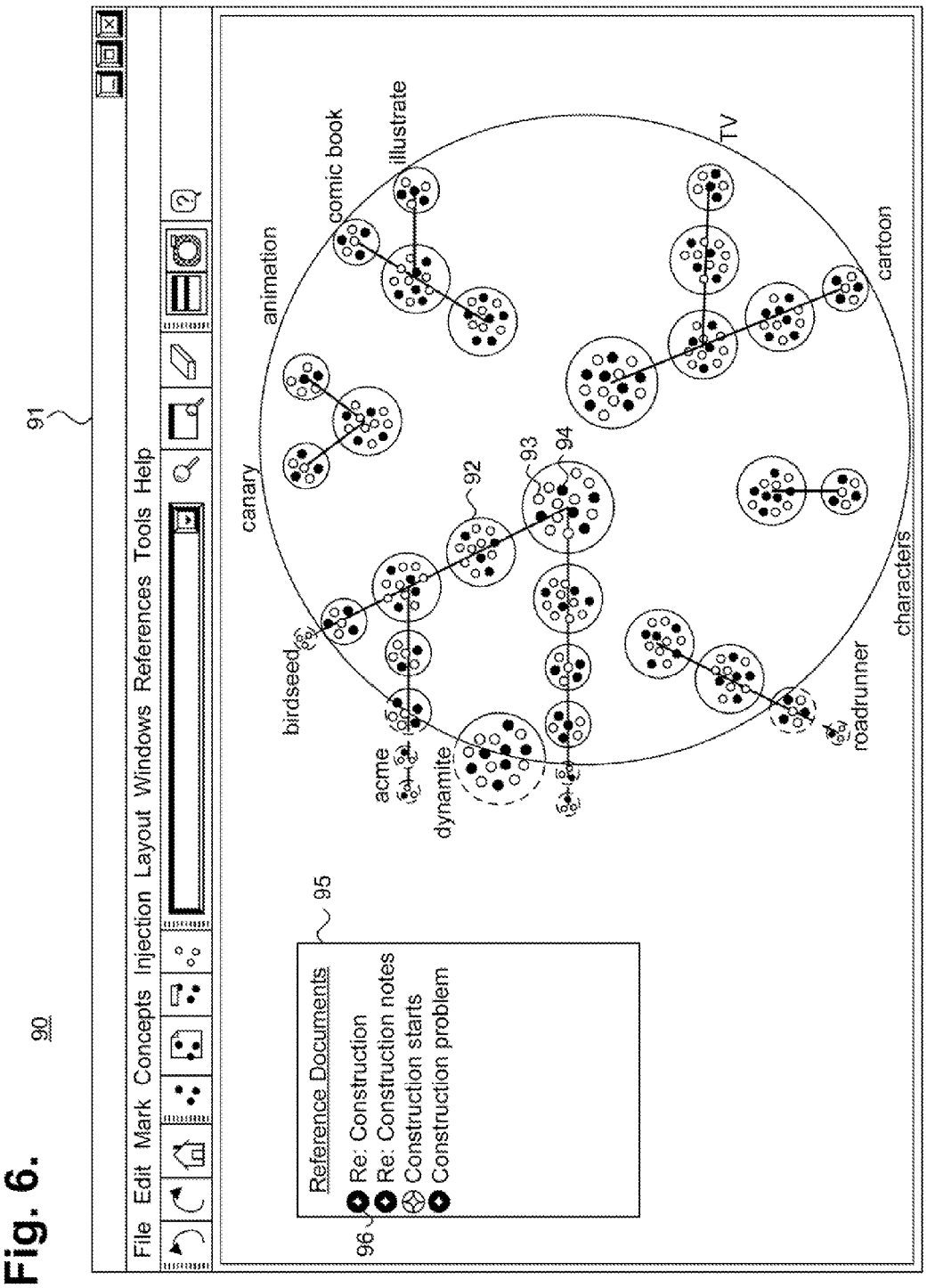
FIG. 6 is a screenshot showing, by way of example, a visual display of reference concepts in relation to uncoded concepts.

Organizing the clusters into spines and groups of cluster spines provides an individual reviewer with a display that presents the concepts according to a theme while maximizing the number of relationships depicted between the concepts. FIG. 6 is a screenshot 90 showing, by way of example, a visual display 91 of similar reference concepts 94 and uncoded concepts 94. Clusters 92 of the uncoded concepts 93 can be located along a spine, which is a vector, based on a similarity of the uncoded concepts 93 in the clusters 92. The uncoded concepts 93 are each represented by a smaller circle within the clusters 92.

Similar reference concepts 94 identified for a selected uncoded concept 93 can be displayed in a list 95 by document title or other identifier. Also, classification codes 96 associated with the similar reference concepts 94 can be displayed as circles having a diamond shape within the boundary of the circle. The classification codes 96 can include "privileged," "responsive," and "non-responsive" codes, as well as other codes. The different classification codes 96 can each be represented by a color, such as blue for "privileged" reference documents and yellow for "non-responsive" reference concepts. Other display representations of the uncoded concepts, similar reference concepts, and classification codes are possible, including by symbols and shapes.

The classification codes 96 of the similar reference concepts 94 can provide suggestions for classifying the selected uncoded concept based on factors, such as a number of different classification codes for the similar reference concepts and a number of similar reference concepts associated with each classification code. For example, the list of reference concepts includes four similar reference concepts identified for a particular uncoded concept. Three of the reference concepts are classified as "privileged," while one is classified as "non-responsive." In making a decision to assign a classification code to a selected uncoded concept, the reviewer can consider classification factors based on the similar reference concepts, such as a presence or absence of similar reference concepts with different classification codes and a quantity of the similar reference concepts for each classification code. Other classification factors are possible. In the current example, the display 91 provides suggestions, including the number of "privileged" similar reference concepts, the number of "non-responsive" similar reference concepts, and the absence of other classification codes of similar reference concepts. Based on the number of "privileged" similar reference concepts compared to the number of "non-responsive" similar reference concepts, the reviewer may be more inclined to classify the selected uncoded concepts as "privileged." Alternatively, the reviewer may wish to further review the selected uncoded concept based on the multiple classification codes of the similar reference concepts. Other classification codes and combinations of classification codes are possible. The reviewer can utilize the suggestions provided by the similar reference concepts to assign a classification to the selected uncoded concept. In a further embodiment, the now classified and previously uncoded concept can be added to the set of reference concepts for use in classifying other uncoded concepts.

In a further embodiment, similar reference concepts can be identified for a cluster or spine to provide suggestions for classifying the cluster and spine. For a cluster, the similar reference concepts are identified based on a comparison of a score vector for the cluster, which is representative of the cluster center and the reference concept score vectors. Meanwhile, identifying similar reference concepts for a spine is based on a comparison between the score vector for the spine, which is based on the cluster center of all the clusters along that spine, and the reference concept score vectors. Once identified, the similar reference concepts are used for classifying the cluster or spine.

Figure 7:
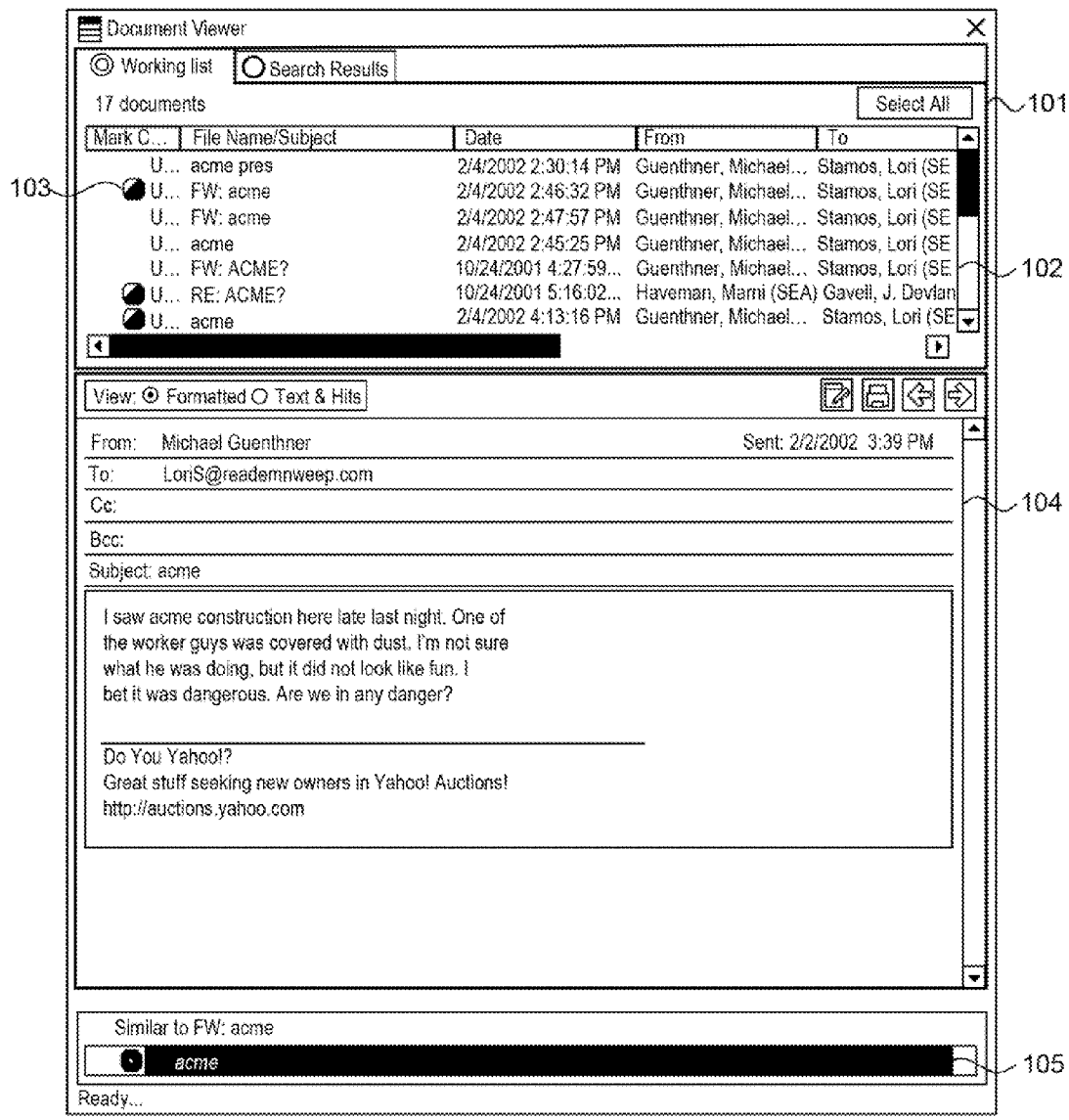
FIG. 7 is an alternative visual display of the similar reference concepts and uncoded concepts.

In an even further embodiment, the uncoded concepts, including the selected uncoded concept, and the similar reference concepts can be displayed as a concept list. FIG. 7 is a screenshot 100 showing, by way of example, an alternative visual display of the similar reference concepts 105 and uncoded concepts 102. The uncoded concepts 102 can be provided as a list in an uncoded concept box 101, such as an email inbox. The uncoded concepts 102 can be identified and organized based on metadata about the uncoded concept or information provided in the associated documents.

At least one of the uncoded concepts can be selected and displayed in a concept viewing box 104. The selected uncoded concept can be identified in the list 101 using a selection indicator (not shown), including a symbol, font, or highlighting. Other selection indicators and uncoded concept factors are possible. Once identified, the selected uncoded concept can be compared to a set of reference concepts to identify the reference concepts 85 most similar. The identified similar reference concepts 105 can be displayed below the concept viewing box 104 with an associated classification code 103. The classification code of the similar reference concept 105 can be used as a suggestion for classifying the selected uncoded concept. After assigning a classification code, a representation 103 of the classification can be provided in the display with the selected uncoded concept. In a further embodiment, the now classified and previously uncoded concept can be added to the set of reference concepts.

Machine Classification of Uncoded Documents

Similar reference concepts can be used as suggestions to indicate a need for manual review of the uncoded concepts, when review may be unnecessary, and hints for classifying the uncoded concepts, clusters, or spines. Additional information can be generated to assist a reviewer in making classification decisions for the uncoded concepts, such as a machine-generated confidence level associated with a suggested classification code, as described in common-assigned U.S. Patent Application Publication No. 2011/0029529, published Feb. 3, 2011, pending, the disclosure of which is incorporated by reference.

The machine-generated suggestion for classification and associated confidence level can be determined by a classifier. FIG. 8 is a process flow diagram 110 showing, by way of example, a method for classifying uncoded concepts by a classifier for use in the method of FIG. 2. An uncoded concept is selected from a cluster (block 111) and compared to a neighborhood of x-similar reference concepts (block 112) to identify those similar reference concepts that are most relevant to the selected uncoded concept. The selected uncoded concept can be the same as the uncoded concept selected for identifying similar reference concepts or a different uncoded concept. In a further embodiment, a machine-generated suggestion can be provided for a cluster or spine by selecting and comparing the cluster or spine to a neighborhood of x-reference concepts for the cluster or spine.

The neighborhood of x-similar reference concepts is determined separately for each selected uncoded concept and can include one or more similar reference concepts. During neighborhood generation, a value for x-similar reference concepts is first determined automatically or by an individual reviewer. The neighborhood of similar reference concepts can include the reference concepts, which were identified as similar reference concepts according to the method of FIG. 5, or reference concepts located in one or more clusters, such as the same cluster as the selected uncoded document or in one or more files, such as an email file. Next, the x-number of similar reference concepts nearest to the selected uncoded concept are identified. Finally, the identified x-number of similar reference concepts are provided as the neighborhood for the selected uncoded concept. In a further embodiment, the x-number of similar reference concepts are defined for each classification code, rather than across all classification codes. Once generated, the x-number of similar reference concepts in the neighborhood and the selected uncoded concept are analyzed by the classifier to provide a machine-generated classification suggestion for assigning a classification code (block 113). A confidence level for the machine-generated classification suggestion is also provided (block 114).

The machine-generated analysis of the selected uncoded concept and x-number of similar reference concepts can be based on one or more routines performed by the classifier, such as a nearest neighbor (NN) classifier. The routines for determining a suggested classification code include a minimum distance classification measure, also known as closest neighbor, minimum average distance classification measure maximum count classification measure, and distance weighted maximum count classification measure. The minimum distance classification measure for a selected uncoded concept includes identifying a neighbor that is the closest distance to the selected uncoded concept and assigning the classification code of the closest neighbor as the suggested classification code for the selected uncoded concept. The closest neighbor is determined by comparing the score vectors for the selected uncoded concept with each of the x-number of similar reference concepts in the neighborhood as the cos σ to determine a distance metric. The distance metrics for the x-number of similar reference concepts are compared to identify the similar reference concept closest to the selected uncoded concept as the closest neighbor.

The minimum average distance classification measure includes calculating an average distance of the similar reference concepts for each classification code. The classification code of the similar reference concepts having the closest average distance to the selected uncoded concept is assigned as the suggested classification code. The maximum count classification measure, also known as the voting classification measure, includes counting a number of similar reference concepts for each classification code and assigning a count or "vote" to the similar reference concepts based on the assigned classification code. The classification code with the highest number of similar reference concepts or "votes" is assigned to the selected uncoded concept as the suggested classification code. The distance weighted maximum count classification measure includes identifying a count of all similar reference concepts for each classification code and determining a distance between the selected uncoded concept and each of the similar reference concepts. Each count assigned to the similar reference concepts is weighted based on the distance of the similar reference concept from the selected uncoded concept.

The classification code with the highest count, after consideration of the weight, is assigned to the selected uncoded concept as the suggested classification code.

The machine-generated suggested classification code is provided for the selected uncoded concept with a confidence level, which can be presented as an absolute value or a percentage. Other confidence level measures are possible. The reviewer can use the suggested classification code and confidence level to assign a classification to the selected uncoded concept. Alternatively, the x-NN classifier can automatically assign the suggested classification code. In one embodiment, the x-NN classifier only assigns an uncoded concept with the suggested classification code if the confidence level is above a threshold value, which can be set by the reviewer or the x-NN classifier.

Machine classification can also occur on a cluster or spine level once one or more concepts in the cluster have been classified. For instance, for cluster classification, a cluster is selected and a score vector for the center of the cluster is determined as described above with reference to FIG. 5. A neighborhood for the selected cluster can be determined based on a distance metric. The x-number of similar reference concepts that are closest to the cluster center can be selected for inclusion in the neighborhood, as described above. Each concept in the selected cluster is associated with a score vector from which the cluster center score vector is generated. The distance is then determined by comparing the score vector of the cluster center with the score vector for each of the similar reference concepts to determine an x-number of similar reference concepts that are closest to the cluster center. However, other methods for generating a neighborhood are possible. Once determined, one of the classification routines is applied to the neighborhood to determine a suggested classification code and confidence level for the selected cluster. The neighborhood of x-number of reference concepts is determined for a spine by comparing a spine score vector with the vector for each similar reference concept to identify the neighborhood of similar concepts that are the most similar.

In a further embodiment, once the uncoded concepts are assigned a classification code, the newly-classified uncoded concepts can be placed into the concept reference set for use in providing classification suggestions for other uncoded concepts.

In yet a further embodiment, each document can be represented by more than one concept. Accordingly, to determine a classification code for the document, the classification codes for each of the associated concepts can be analyzed and compared for consideration in classifying the document. In one example, a classification code can be determined by counting the number of associated concepts for each classification code and then assigned the classification code with the most associated concepts. In a further example, one or more of the associated concepts can be weighted and the classification code associated with the highest weight of concepts is assigned. Other methods for determining a classification code for uncoded documents based on reference concepts are possible.

Although clustering and displaying relationships has been described above with reference to concepts, other tokens, such as word-level or character-level n-grams, raw terms, and entities, are possible.

While the invention has been particularly shown and described as referenced to the embodiments thereof, those skilled in the art will understand that the foregoing and other changes in form and detail may be made therein without departing from the spirit and scope.

What is claimed is:

1. A method for displaying relationships between concepts to provide classification suggestions via nearest neighbor, comprising the steps of:
   providing reference concepts each associated with a classification code and a set of uncoded concepts, wherein each of the reference concepts and the uncoded concepts comprises one or more nouns extracted from a plurality of documents;
   associating each reference concept with a symbol representing the classification code;
   comparing at least one uncoded concept with the reference concepts and identifying one or more of the reference concepts that are similar to the at least one uncoded concept;
   displaying relationships between the at least one uncoded concept and the similar reference concepts for classifying the at least one uncoded concept based on the classification symbols of the similar reference concepts comprising at least one of:
      displaying one or more of a presence and absence of the similar reference concepts with different classification codes; and
      displaying a quantity of the similar reference concepts for each of the different classification codes;
   providing at least one visual classification suggestion based on the displayed relationships; and
   receiving a classification code for the at least one uncoded concept from a human reviewer based on the at least one suggestion,
   wherein the steps are performed on a suitably programmed computer.

2. A method according to claim 1, further comprising:
   classifying the at least one uncoded concept by assigning a classification code based on the relationships between the at least one uncoded concept and the similar reference concepts.

3. A method according to claim 2, further comprising:
   adding the classified at least one uncoded concept to the reference concepts.

4. A method according to claim 2, further comprising:
   providing a confidence level for the classification code of the at least one uncoded concept.

5. A method according to claim 2, further comprising:
   identifying the documents associated with the at least one classified concept; and
   assigning the classification code for the at least one classified concept to one or more of the associated documents.

6. A method according to claim 5, wherein the documents are identified using a matrix comprising a mapping of concepts and related documents.

7. A method according to claim 1, further comprising:
   generating the reference concepts from a set of concepts, comprising at least one of:
      identifying the concepts that are dissimilar from each other concept in the set of concepts and assigning the classification code to each of the dissimilar concepts, as the reference concepts; and
      grouping the set of concepts into clusters, selecting one or more of the concepts in at least one cluster, and assigning the classification code to each of the selected concepts, as the reference concepts.

8. A method according to claim 1, further comprising:
   determining the similar reference concepts, comprising:
      forming a score vector for each uncoded concept and each reference concept; and calculating a similarity metric by comparing the score vectors for the at least one uncoded concept and each of the reference concepts; and selecting the reference concepts with the highest similarity metrics as the similar reference concepts.

9. A method according to claim 1, further comprising: determining the similar reference concepts, comprising:
determining a measure of similarity between the at least one uncoded concept and each of the reference concepts based on the comparison;
applying a threshold to the measures of similarity; and
selecting those reference concepts that satisfy the threshold as the similar reference concepts.

10. A method according to claim 1, further comprising:
clustering the uncoded concepts and displaying the clusters; and
displaying the similar reference concepts in a list adjacent to the clusters.

11. A system for displaying relationships between concepts to provide classification suggestions via nearest neighbor, comprising:
a database to maintain reference concepts each associated with a classification code and a set of uncoded concepts, wherein each of the reference concepts and the uncoded concepts comprises one or more nouns extracted from a plurality of documents;
an association module to associate each reference concept with a symbol representing the classification code;
a similarity module to compare at least one uncoded concept with the reference concepts and to identify one or more of the reference concepts that are similar to the at least one uncoded concept;
a display to display relationships between the at least one uncoded concept and the similar reference concepts for classifying the at least one uncoded concept based on the classification symbols of the similar reference concepts comprising at least one of:
a presence module to display one or more of a presence and absence of the similar reference concepts with different classification codes; and
a quantity module to display a quantity of the similar reference concepts for each of the different classification codes;
a suggestion module to provide at least one visual classification suggestion based on the displayed relationships;
a classification module to receive a classification code for the at least one uncoded concept from a human reviewer based on the at least one suggestion; and
a computer processor to execute the modules.

12. A system according to claim 11, further comprising:
a classification module to classify the at least one uncoded concept by assigning a classification code based on the relationships between the at least one uncoded concept and the similar reference concepts.

13. A system according to claim 12, further comprising:
a reference module to add the classified at least one uncoded concept to the reference concepts.

14. A system according to claim 12, wherein the classification module provides a confidence level for the classification code of the at least one uncoded concept.

15. A system according to claim 12, further comprising:
a document classification module to identify the documents associated with the at least one classified concept and to assign the classification code for the at least one classified concept to one or more of the associated documents.

16. A system according to claim 15, wherein the documents are identified using a matrix comprising a mapping of concepts and related documents.

17. A system according to claim 11, further comprising:
a reference set module to generate the reference concepts from a set of concepts, comprising at least one of:
a comparison module to identify the concepts that are dissimilar from each other concept in the concept set and to assign the classification code to each of the dissimilar concepts, as the reference concepts; and
a reference clustering module to group the set of concepts into one or more clusters, to select one or more of the concepts in at least one cluster, and to assign the classification code to each of the selected concepts, as the reference concepts.

18. A system according to claim 11, further comprising:
a concept similarity module to determine the similar reference concepts, comprising:
a vector module to form a score vector for each uncoded concept and each reference concept; and
a similarity measurement module to calculate a similarity metric by comparing the score vectors for the at least one uncoded concept and each of the reference concepts and to select the reference concepts with the highest similarity metrics as the similar reference concepts.

19. A system according to claim 11, further comprising:
a concept similarity module to determine the similar reference concepts, comprising:
a similarity measurement module to determine a measure of similarity between the at least one uncoded concept and each of the reference concepts based on the comparison; and
a threshold module to apply a threshold to the measures of similarity and to select those reference concepts that satisfy the threshold as the similar reference concepts.

20. A system according to claim 11, further comprising:
a clustering module to cluster the uncoded concepts; and
the display to present the clusters and the similar reference concepts in a list adjacent to the clusters.

* * * * *